US007232008B2

(12) United States Patent
Levi et al.

(10) Patent No.: US 7,232,008 B2
(45) Date of Patent: Jun. 19, 2007

(54) ACTIVE ANTI-TIP WHEELS FOR POWER WHEELCHAIR

(75) Inventors: Ronald Levi, Courtdale, PA (US); James P. Mulhern, Nanticoke, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 185 days.

(21) Appl. No.: 10/943,713

(22) Filed: Sep. 17, 2004

(65) Prior Publication Data

US 2005/0077694 A1 Apr. 14, 2005

Related U.S. Application Data

(60) Provisional application No. 60/553,998, filed on Mar. 16, 2004, provisional application No. 60/509,571, filed on Oct. 8, 2003.

(51) Int. Cl.
*B62B 1/00* (2006.01)

(52) U.S. Cl. .................... 180/907; 280/763.1; 280/767

(58) Field of Classification Search ................ 180/907, 180/908, 65.1, 250.1; 280/124.12, 47.16, 280/763.1, 764.1, 767
See application file for complete search history.

(56) References Cited

U.S. PATENT DOCUMENTS

| | | | | |
|---|---|---|---|---|
| 1,773,254 A | | 8/1930 | Becker | 280/755 |
| 3,520,378 A | | 7/1970 | Slay | 180/21 |
| 3,848,883 A | | 11/1974 | Breacain | 280/5.32 |
| 4,128,137 A | | 12/1978 | Booth | 180/6.5 |
| 4,245,847 A | | 1/1981 | Knott | 280/5.2 |
| 4,437,678 A | | 3/1984 | Schultz | 280/276 |
| 5,435,404 A | | 7/1995 | Garin, III | 180/6.5 |
| 5,564,512 A | | 10/1996 | Scheulderman | 180/65.5 |
| 5,772,237 A | | 6/1998 | Finch et al. | 280/704 |
| 5,848,658 A | | 12/1998 | Pulver et al. | |
| 5,855,387 A | | 1/1999 | Gill et al. | 280/283 |
| 5,964,473 A | | 10/1999 | Degonda et al. | 280/250.1 |
| 6,041,876 A | * | 3/2000 | Pulver et al. | 180/65.1 |
| 6,047,979 A | | 4/2000 | Kraft et al. | 280/250.1 |
| 6,062,600 A | | 5/2000 | Kamen et al. | 280/755 |

(Continued)

FOREIGN PATENT DOCUMENTS

| | | |
|---|---|---|
| FR | 2215054 | 8/1974 |

(Continued)

*Primary Examiner*—Christopher P. Ellis
*Assistant Examiner*—Brian Swenson
(74) *Attorney, Agent, or Firm*—DLA Piper US LLP

(57) ABSTRACT

An anti-tip system is provided for stabilizing a vehicle, such as a power wheelchair, about a pitch axis and relative to a ground plane. The anti-tip system includes at least one anti-tip wheel. The mounting assembly for the anti-tip wheel is configured such that it traverses linearly in a direction toward or away from the ground plane and is responsive to an acceleration or deceleration of the wheelchair. As the wheelchair accelerates or decelerates, rotational motion of the drive train assembly is transmitted to a guide subassembly within the mounting to effect translation of the anti-tip wheel. Upward translation of the anti-tip wheel enables the wheelchair to negotiate obstacles, e.g., curbs or steps, while downward translation or force enhances stability when stopping the wheelchair or while moving down sloping terrain or surfaces. The anti-tip wheels may be castors and normally contacting the ground during operation.

23 Claims, 6 Drawing Sheets

U.S. PATENT DOCUMENTS

| | | | | |
|---|---|---|---|---|
| 6,129,165 | A | 10/2000 | Schaffner et al. | |
| 6,135,222 | A * | 10/2000 | Furukawa | 180/65.5 |
| 6,196,343 | B1 | 3/2001 | Strautnieks | 180/22 |
| 6,234,507 | B1 | 5/2001 | Dickie et al. | 280/304.1 |
| 6,241,391 | B1 | 6/2001 | Hoose | |
| 6,357,793 | B1 | 3/2002 | Dickie et al. | 280/755 |
| 6,460,641 | B1 | 10/2002 | Kray | 180/24.02 |
| 6,533,306 | B2 | 3/2003 | Watkins | 280/340.1 |
| 6,543,798 | B2 | 4/2003 | Schaffner et al. | 280/65.1 |
| 6,554,086 | B1 | 4/2003 | Goertzen et al. | 180/65.1 |
| 6,712,369 | B2 | 3/2004 | Wu | |
| 6,851,711 | B2 | 2/2005 | Goertzen et al. | 280/755 |
| 7,040,429 | B2 * | 5/2006 | Molnar | 180/65.1 |
| 7,066,290 | B2 * | 6/2006 | Fought | 180/65.5 |
| 7,104,346 | B2 * | 9/2006 | Schaffner | 180/65.1 |
| 2003/0075365 | A1 | 4/2003 | Fought | 180/6.5 |
| 2004/0004342 | A1 | 1/2004 | Mulhern et al. | 280/304.1 |
| 2004/0035627 | A1 | 2/2004 | Richey et al. | 180/210 |
| 2004/0046358 | A1 | 3/2004 | White et al. | 280/304.1 |
| 2004/0060748 | A1 | 4/2004 | Molnar et al. | 180/65.1 |
| 2004/0251649 | A1 | 12/2004 | Wu | 280/86.1 |

FOREIGN PATENT DOCUMENTS

| | | |
|---|---|---|
| FR | 2215054 | 3/1979 |
| FR | 2399822 | 3/1979 |
| JP | 2001104391 | 4/2001 |
| WO | 90/06097 | 6/1990 |
| WO | 00/53142 | 9/2000 |
| WO | WO 00/54718 | 9/2000 |
| WO | 01/29438 | 4/2001 |

* cited by examiner

ACTIVE ANTI-TIP WHEELS FOR POWER WHEELCHAIR

CROSS REFERENCE RELATED APPLICATIONS

This present application claims the benefit of the filing dates of U.S. Provisional Patent Application No. 60/553,998, filed on Mar. 16, 2004, and U.S. Provisional Application No. 60/509,571, filed on Oct. 8, 2003.

TECHNICAL FIELD

The present invention relates to powered vehicles, such as power wheelchairs, and more particularly to a new and useful power vehicle having an anti-tip system for greater maneuverability while furthermore enhancing pitch stability.

BACKGROUND OF THE INVENTION

Self-propelled or powered vehicles, such as power wheelchairs, have vastly improved the mobility/transportability of the disabled and/or handicapped. Whereas in the past, disabled/handicapped individuals were nearly entirely reliant upon the assistance of others for transportation, the Americans with Disabilities Act (ADA) of June 1990 has effected sweeping changes to provide equal access and freedom of movement/mobility for disabled individuals. Notably, various structural changes have been mandated to the construction of homes, offices, entrances, sidewalks, and even parkway/river crossing, e.g., bridges, to include enlarged entrances, powered doorways, entrance ramps, curb ramps, etc., to ease mobility for disabled persons in and around society.

Along with these societal changes, has brought an opportunity to offer better, more agile, longer-running and/or more stable powered wheelchairs to take full advantage of the new freedoms imbued by the ADA. More specifically, various technologies, initially developed for the automobile and aircraft industries, are being successfully applied to powered wheelchairs to enhance the ease of control, improve stability, and/or reduce wheelchair weight and bulk. For example, sidearm controllers, i.e., multi-axis joysticks, employed in high technology VTOL and fighter aircraft, are being utilized for controlling the speed and direction of powered wheelchairs. Innovations made in the design of automobile suspension systems, e.g., active suspension systems, which vary spring stiffness to vary ride efficacy, have also been adapted to wheelchairs to improve and stabilize powered wheelchairs. Other examples include the use of high-strength fiber reinforced composites, e.g. graphite, fiberglass, etc. to improve the strength of the wheelchair frame while reducing weight and bulk.

One particular system which has gained widespread popularity/acceptance is mid-wheel drive powered wheelchairs, and more particularly, such powered wheelchairs with anti-tip systems. Mid-wheel powered wheelchairs are designed to position the drive wheels, i.e., the rotational axes thereof, slightly forward of the occupant's Center Of Gravity (COG) to provide enhanced mobility and maneuverability. Anti-tip systems provide enhanced stability of the wheelchair about its pitch axis and, in some of the more sophisticated anti-tip designs, improve the obstacle or curb-climbing ability of the wheelchair. Such mid-wheel powered wheelchairs and/or powered wheelchairs having anti-tip systems are disclosed in Schaffner et al. U.S. Pat. Nos. 5,944,131 & 6,129,165, both issued and assigned to Pride Mobility Products Corporation located in Exeter, Pa.

While such wheelchair designs have vastly improved the capability and stability of powered wheelchairs, designers thereof are continually being challenged to examine and improve wheelchair design and construction. For example, the Schaffner '131 patent discloses a mid-wheel drive wheelchair having a passive anti-tip system. A brief examination thereof reveals that two separate and distinct suspension struts are employed for mounting (i) the drive wheel/drive train assembly to the main structural frame of the wheelchair, and (ii) an anti-tip wheel to a forward portion of the main structural frame. As such, passive anti-tip systems typically necessitate the use of two independent spring-strut assemblies thus increasing mechanical complexity, maintenance requirements, cost (i.e., the cost of two spring-strut assemblies), and weight.

The Schaffner '165 patent discloses a mid-wheel drive powered wheelchair having an anti-tip system which is "active" in contrast to the passive system discussed previously and disclosed in the '131 patent. Such anti-tip systems are responsive to accelerations or decelerations of the wheelchair to actively vary the position of the anti-tip wheels, thereby improving the wheelchair's ability to climb curbs or overcome obstacles. More specifically, the active anti-tip system mechanically couples the suspension system of the anti-tip wheel to the drive-train assembly such that the anti-tip wheels displace upwardly or downwardly as a function of the magnitude of torque applied to the drive train assembly.

The systems are mechanically coupled by a longitudinal suspension arm pivotally mounted to the main structural frame. To one end of the suspension arm is mounted a drive-train assembly, and, to the other end, an anti-tip wheel. To better visualize the arrangement, it is important to understand that the propulsion system employs two independently-controlled and operated drive wheels, each being driven by a separate drive-train assembly (i.e. motor-gear box assembly). The suspension arm is pivotally mounted at a single point, between the drive-train assembly and the anti-tip wheel, and spring-biased to a neutral position by a pair of spring-strut assemblies, each one of the pair being disposed on an opposite side of the pivot mount.

In operation, torque from a drive wheel is reacted by the main structural frame resulting in relative rotational displacement between the drive train assembly and the frame. The relative motion therebetween, in turn, effects rotation of the suspension arm about its pivot axis in a clockwise or counterclockwise depending upon the direction of the applied torque. That is, upon an acceleration, or increased torque input (as may be required to overcome or climb an obstacle), counterclockwise rotation of the drive-train assembly will occur effecting upward vertical displacement of the respective anti-tip wheel. Consequently, the anti-tip wheels are "actively" lifted or raised to facilitate such operational modes, e.g., curb climbing. Alternatively, deceleration causes a clockwise rotation of the drive-train assembly, thus effecting a downward vertical displacement of the respective anti-tip wheel. As such, the downward motion of the anti-tip wheel assists to stabilize the wheelchair wheels when traversing downwardly sloping terrain or a negative decline. Here again, the anti-tip system "actively" responds to a change in applied torque to vary the position of the anti-tip wheel.

While the active anti-tip system disclosed in the Schaffner patent '165 offers significant advances by comparison to prior art passive systems, it too has certain drawbacks and limitations. For example, the active anti-tip system of Schaffner, as a practical matter, also requires two spring-strut assemblies to bias the position of each anti-tip wheel. While only requiring a single pivot connection, for mounting or suspending the anti-tip system, the dual spring-strut arrangement is mechanically complex, costly, requires periodic maintenance and adds weight. Yet another disadvantage of such active anti-tip system relates to design limitations caused by the single pivot connection and, consequently, performance compromises. It will be appreciated, for example, that the one piece construction of the suspension arm necessarily requires that both the drive-train assembly and the respective anti-tip wheel must necessarily enscribe the same angle, i.e., the angles are identical. As such, to vary a predefined vertical displacement of the anti-tip wheel, (as maybe desired to overcome larger curbs or obstacles), it is necessary to vary the length of the suspension arm.

One can best appreciate the challenges of this configuration by examining a simple design requirement which will frequently be encountered. Should, for example, a three inch displacement of the forward anti-tip wheel be required to overcome a three inch curb or obstacle, the forward portion of the suspension arm, i.e., from the pivot axis to the anti-tip wheel, would necessarily measure nearly 35 inches to accommodate this design requirement. An assumption is made that drive-train assembly pivots 5° relative to the main structural frame. If, on the other hand, the drive-train assembly were permitted to traverse a larger angle, e.g., 20°, the anti-tip wheels could be positioned significantly farther inboard, to accommodate the 3-inch design requirement. While this approach may enable greater vertical travel of the anti-tip wheel, other wheelchair structure, e.g., a footrest assembly, may interfere and prohibit this design option. It will, therefore, be appreciated that the single pivot mount design, while elegant and simple, leaves few options available for the designer to satisfy other requirements.

Moreover, when altering the horizontal length (in the longitudinal direction) of the suspension arm, the horizontal path taken by the anti-tip wheels will vary in accordance with the arm radius. Stated another way, as the suspension arm varies in length from long to short, the anti-tip wheels traverse a more arcuate path, i.e., rather than a substantially linear path. This variation can significantly impact the curb-climbing ability of the anti-tip system. More specifically, it will be appreciated that when a curb or obstacle impacts the anti-tip wheel at or near a point which is in-line with the wheel's rotational axis, the anti-tip wheel will have a tendency to move upward or downward depending upon the vertical location of the pivot axis of the suspension arm. In a system having a short suspension arm, i.e., one which effects an arcuate travel of the wheel, wherein the wheel axis lies below the pivot axis of the suspension arm, an anti-tip wheel will have a tendency to move downwardly under the above described loading conditions. This downward travel is, of course, contrary to a desired upward motion for climbing curbs or other obstacles.

Finally, inasmuch as powered wheelchairs of this type, i.e., mid-wheeled vehicles, are most appropriately stabilized by a pair of anti-tip wheels disposed forwardly and rearwardly of the main drive wheels, at least one pair of anti-tip wheels is typically castored, i.e., for pivoting/rotation about a vertical axis. Inasmuch as such castored wheels occupy valuable space aboard powered wheelchairs, e.g., interfere with footrest assemblies or an occupants feet/legs, sometimes one of the anti-tip wheel pairs to enable unrestricted yaw control/motion of the wheelchair 2. Consequently, there may be a lag in pitch stabilization response.

A need, therefore, exists for an active anti-tip system, which eliminates the need for multiple strut assemblies, provides greater design flexibility (especially the design flexibility to position the anti-tip wheels at practically any longitudinal and/or vertical position) and facilitates ground contact of the anti-tip wheel system during routine operating conditions.

SUMMARY OF THE INVENTION

An anti-tip system is provided for stabilizing a vehicle, such as a powered wheelchair, about a pitch axis and relative to a ground plane. The anti-tip system includes at least one anti-tip wheel disposed on a side of the wheelchair pitch axis, an assembly for mounting the anti-tip wheel to the main structural frame, and a suspension assembly. The mounting assembly is configured to cause the anti-tip wheel to traverse linearly in response to an acceleration of the wheelchair. The suspension assembly is disposed in combination with the mounting assembly and biases the anti-tip wheels to a predetermined operating position. In one embodiment, the anti-tip wheels are castored, i.e., both forward and aft stabilizing anti-tip wheels, and the predetermined operating position corresponds to the anti-tip wheels contacting the ground plane during normal wheelchair operation. A compliant mounting assembly may also be employed in combination with the castored anti-tip wheels, which may facilitate the curb climbing ability of the wheelchair.

In one embodiment, the mounting assembly further comprises a guide subassembly mounting to the anti-tip wheel and a means for conveying rotational motion of a drive train assembly to the anti-tip wheel. In operation, upward translation of the anti-tip wheel enables the wheelchair to negotiate obstacles, e.g., curbs or steps, while downward translation enhances stability when driving the wheelchair on downwardly sloping terrain or declined surfaces. The guide subassembly may also be angularly pre-positioned to cause upward translation of the anti-tip wheels in response to a horizontal load imposed by an impact/contact with a curb, step or other obstacle.

BRIEF DESCRIPTION OF THE DRAWINGS

For the purpose of illustrating the invention, there is shown in the drawings various forms that are presently preferred; it being understood, however, that this invention is not limited to the precise arrangements and constructions particularly shown.

DETAILED DESCRIPTION OF THE DRAWINGS

Figure 1:
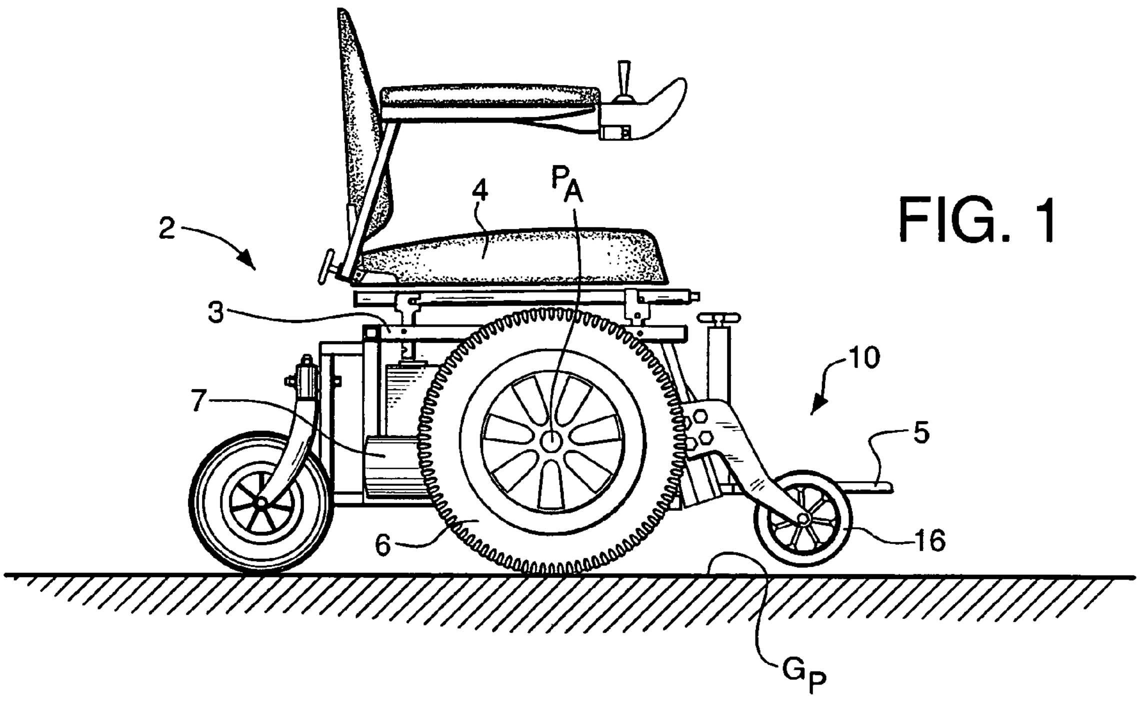
FIG. 1 is a side view of a powered wheelchair employing an active anti-tip system according to the present invention.
Figure 2:
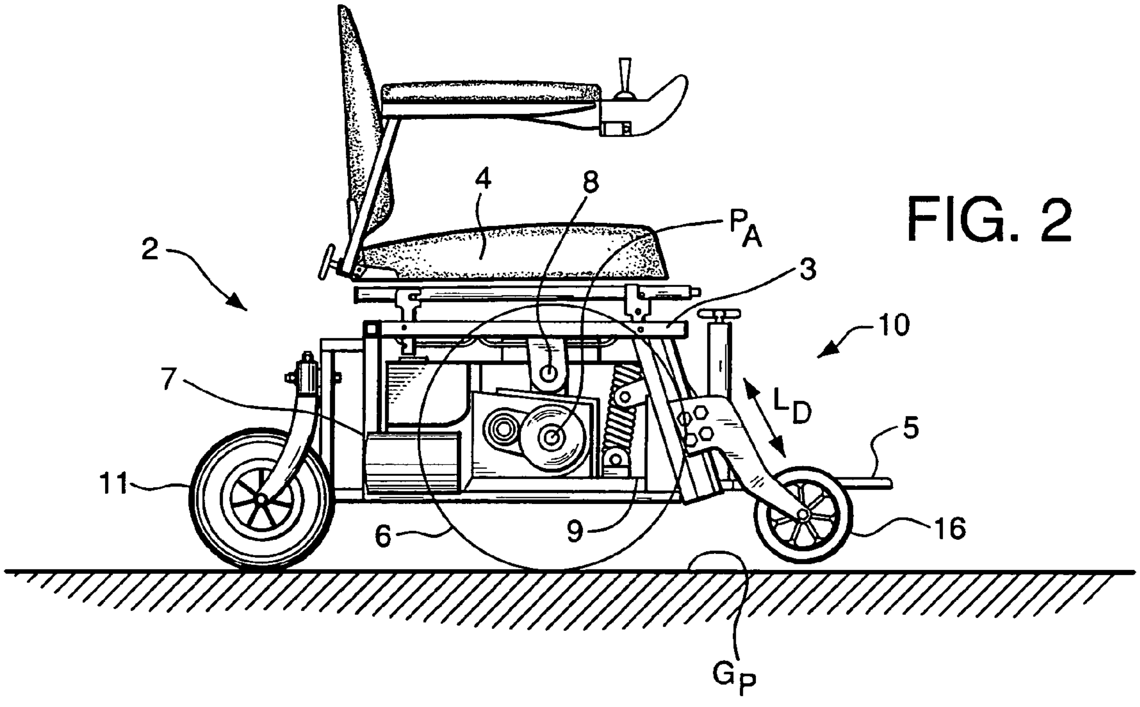
FIG. 2 is partial side view with a drive-wheel removed and portions of the frame structure broken-away to more clearly show the relevant internal components and assemblies including: a guide subassembly for mounting an anti-tip wheel, a bi-directional strut, and a linkage disposed between a drive train assembly and the guide for translating rotational into motion.

Referring now to the drawings wherein like reference numerals identify like elements, components, subassemblies etc., FIGS. 1 and 2 depict a powered wheelchair 2 which has been adapted to accept and mount an anti-tip system 10 of the present invention. The inventive anti-tip system may be employed in any wheelchair which potentially benefits from stabilization about an effective pitch axis $P_A$ and/or enables or controls large angular excursions in relation to a ground plane $G_P$. In the described embodiment, the powered wheelchair 2 comprises an anti-tip system, identified generally by the numeral 10 in FIGS. 1 & 2, a main structural frame 3, a seat 4 (see FIG. 2) for supporting a wheelchair occupant (not shown), a footrest assembly 5 for supporting the feet and legs (also not shown) of the occupant while operating the wheelchair 2, and a pair of drive wheels 6 (shown schematically in the figure) each being independently controlled and driven by a drive train assembly 7. Each drive train assembly 7 is pivotally mounted to the main structural frame 3 about a pivot point 8 to effect relative rotation therebetween in response to torque applied by the drive motor or pitch motion of the frame about an effective pitch axis (not shown). Further, a suspension assembly 9 is provided for biasing an anti-tip wheel to a predetermined operating position and defines the effective pitch axis $P_A$ of the frame.

In the broadest sense of the invention, the anti-tip system 10 includes a mounting assembly 12 disposed in combination with the main structural frame 3 for mounting an anti-tip wheel 16, and, in response to an acceleration of the wheelchair 2, for causing the anti-tip wheel 16 to traverse in a direction (denoted as a two-headed arrow $L_D$ in FIG. 2) substantially normal to the ground plane $G_P$. Furthermore, the suspension assembly 9 is disposed in combination with the mounting assembly 12 for biasing the anti-tip wheel 16 to a predetermined operating position. While the operating position shown is one wherein the anti-tip wheel 16 is raised above and non-contiguous with the ground plane $G_P$, it should be understood that the initial or neutral operating position may or may not contact the ground plane $G_P$. In the described embodiment, the anti-tip wheel 16 is raised relative to the ground plane to enable unrestricted yaw control/displacement of the wheelchair 2. In an alternate embodiment of the invention, shown and discussed in subsequent illustrations and paragraphs, the anti-tip wheel is disposed in ground contact and is castored, i.e., supported for rotation about a vertical axis by one or more cylindrical bearings.

Before discussing the function and/or operation of the anti-tip system 10, it will be useful to provide an overview of the components, assemblies, connections and/or linkages employed to perform the various functions. Furthermore, to facilitate the following description, it will be useful to define a 3-dimensional Cartesian coordinate system CS (shown in FIG. 3) wherein the X-Y plane thereof is parallel to the ground plane and the Z-axis is orthogonal to the X-Y plane.

Figure 4:
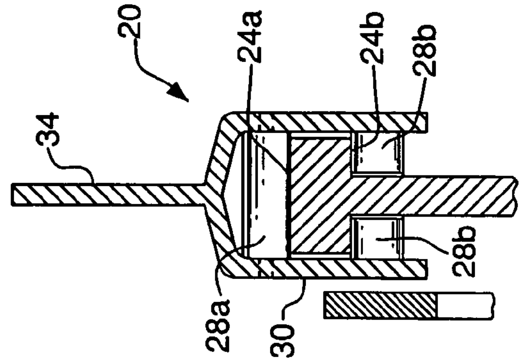
FIG. 4 is a cross sectional view taken substantially along line 4—4 of FIG. 3.
Figure 3:
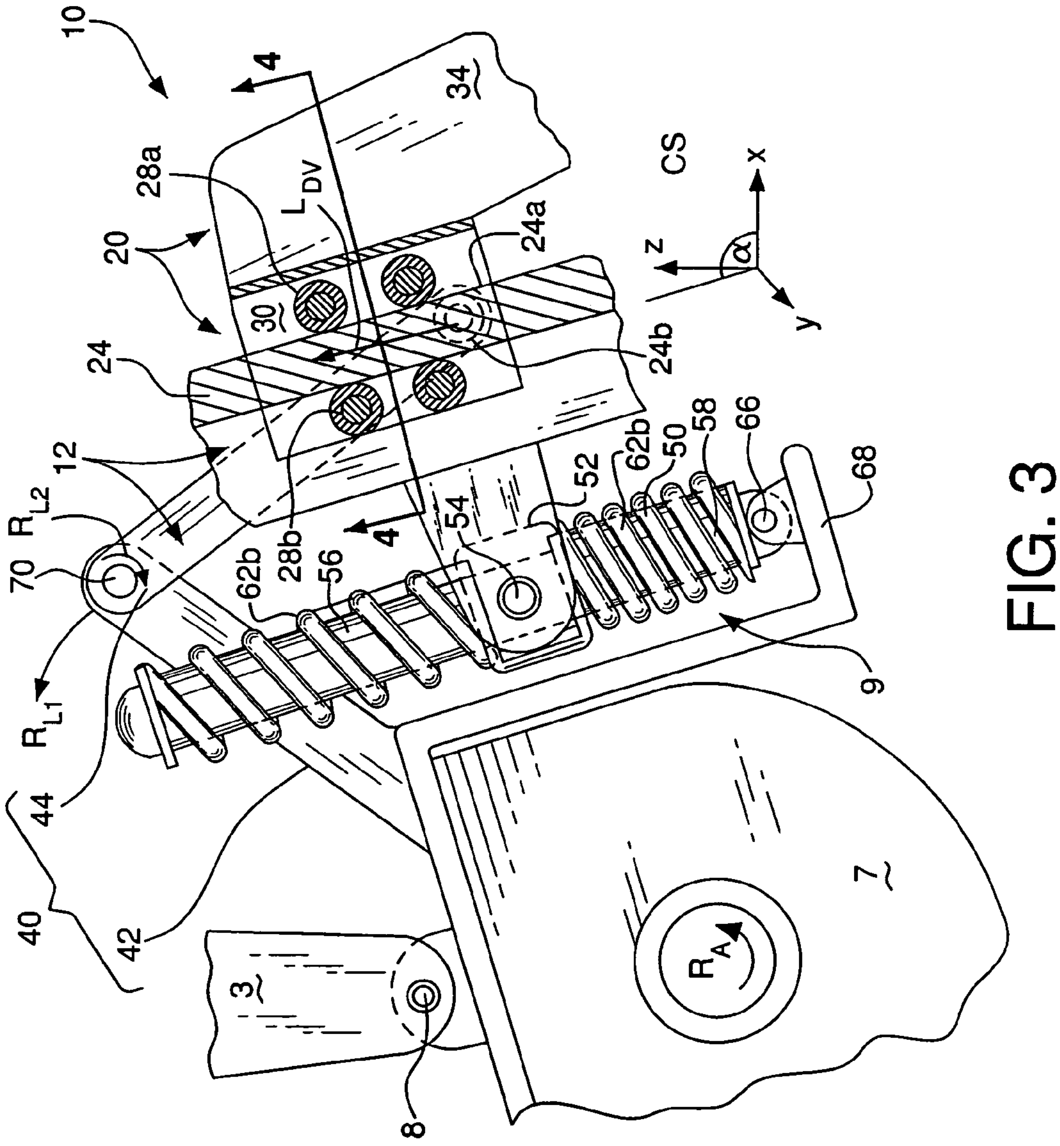
FIG. 3 is an enlarged side view of the anti-tip system wherein the anti-tip wheel is raised to an uppermost vertical position for negotiating curbs and/or other obstacles.

More specifically, and referring to FIGS. 3 and 4, the mounting assembly includes a guide subassembly 20 and a means 40 for converting the pivotal motion of the drive train assembly 7 into linear motion to be conveyed to the guide subassembly 20. The guide subassembly 20 includes at least one guide surface 24*a* or 24*b* which is substantially normal to the ground plane, pictorially illustrated by the X-Y plane of the coordinate system CS. In the context used therein, the term “substantially normal” means that the linear surface 24*a*, or 24*b* defines an angle α which is within a range of between about ninety (90) degrees to about one hundred and forty (140) degrees relative to the ground plane, i.e., X-Y plane. Preferably, the angle α is obtuse and within a range of between about one-hundred (100) to about one-hundred and thirty (130) degrees. The significance of prescribing an angular orientation other than ninety (90) degrees, i.e., an obtuse angle, will be discussed in greater detail hereinafter.

The linear guide subassembly 20 preferably comprises a guide or guide track 24 disposed in combination with the main structural frame 3 (shown in FIG. 2). Further, the guide track 24 forms back-to-back roller guide surfaces 24*a*, 24*b* for guiding one or more pairs of opposed rollers 28*a*, 28*b* (see FIG. 3*b*). The opposing rollers 28*a*, 28*b* engage and capture the guide surfaces 24*a*, 24*b* and are rotatably supported within a roller cage 30. Moreover, a suspension arm 34 is affixed to the roller cage 30 at one end thereof and rotatably mounts the anti-tip wheel (not shown in FIG. 3) at the other end thereof. As such, the anti-tip wheel 16 traverses a substantially linear path parallel to the guide surfaces 24*a*, 24*b*. While the guide surfaces 24*a*, 24*b* define a substantially linear path, it will be appreciated that the surfaces may define a slightly curvilinear path to compensate for other imposed motions. For example, the wheelchair itself causes the anti-tip wheels 16 to traverse an arcuate path. Consequently, to cause the anti-tip wheels 16' to traverse a purely linear path, the guide surfaces may have a slightly convex curvature to compensate for such wheelchair motion.

The translation means 40 is provided for transferring the motion of the drive train assembly 7 (capable of pivoting about pivot point 8) to the guide subassembly 20. More specifically, the translation means 40 includes a first linkage 42 rigidly affixed to the drive train assembly 7, and a second linkage 44 pivotally mounting to the first linkage 42 at one end thereof and to the guide subassembly 20 at the other end. In the preferred embodiment, the second linkage 44 is pivotally mounted to the roller cage 30 of the guide subassembly 20. Consequently, as the drive train assembly 7 pivots in response to an acceleration of the wheelchair 2, the first linkage 42 pivots about pivot point 8 while the second linkage 44 pivots about the first linkage 42 and, additionally, follows the roller cage 30.

The suspension assembly 9 of the anti-tip system 10 is preferably a bi-directional strut 50 pivotally mounted to both the guide track 24 (being supported via the main structural frame 3) and to the drive train assembly 7. More specifically, the strut 50 includes a central collar 52, an elongate tension member 56 disposed through the collar 52 and spring elements 62*a*, 62*b* disposed on each side of the collar 52. The central collar 52 is pivotally mounted to the guide track 24 about a pivot point 54 and the tension member 56 is pivotally mounted at one end 58 thereof to the drive train assembly 7 about a pivot point 66. With respect to the latter, the drive train assembly 7 includes an L-shaped bracket 68 for mounting the lower end 58 of the tension member 56. In the described embodiment, each of the spring elements 62*a*, 62*b* envelop the tension member 56 and are tied to the collar 52 at one end thereof and to the ends of the tension member 56 at the other. Consequently, the tension member 56 may traverse internally of the spring elements 62*a*, 62*b* and the central collar 52. The operation of the suspension assembly 9 will be described in subsequent paragraphs when discussing the overall operation of the anti-tip system 10.

In operation, and referring to FIGS. 2 and 3, the anti-tip system 10 positions the anti-tip wheel 16 in a predetermined operating position. In response to an acceleration, the drive train assembly 7 rotates in a counter-clockwise direction, depicted by the arrow labeled $R_A$, about pivot point 8 (rotational directions correspond to the left profile view shown in FIGS. 2 and 3). Pivoting motion of the drive train assembly 7 effects a substantially vertical/upward displacement of the elongate tension member 56 relative to the collar 52 of the suspension assembly 9. As the tension member 56 traverses, the lower spring element 62*b* compresses biasing the entire mounting assembly 12 and drive train assembly 7 toward a neutral position. As the torque levels are sufficiently large to overcome the spring bias force, the first linkage member 42 is also caused to rotate in a counter-clockwise direction, denoted by arrow $R_{L1}$ in FIG. 3. The second linkage member 44, in turn, rotates in a clockwise direction, denoted by arrow $R_{L2}$ relative to its pivot point 70 at the upper end of the first linkage member 42. Rotation of both linkages 42, 44 causes the upward translation, denoted by arrow $L_{DU}$, of the guide subassembly 20 and, consequently, the anti-tip wheel 16. In this operating mode, the anti-tip wheel 16 is caused to rise above an obstacle to allow the main drive wheels 6, which have a much larger diameter, to climb up and over the obstacle. When the torque levels diminish, such as when the wheelchair is traveling on straight and level ground, the second spring element 62*b* causes the drive train and mounting assemblies 7, 12, to return to their original operating position, e.g., a neutral position.

Figure 5:
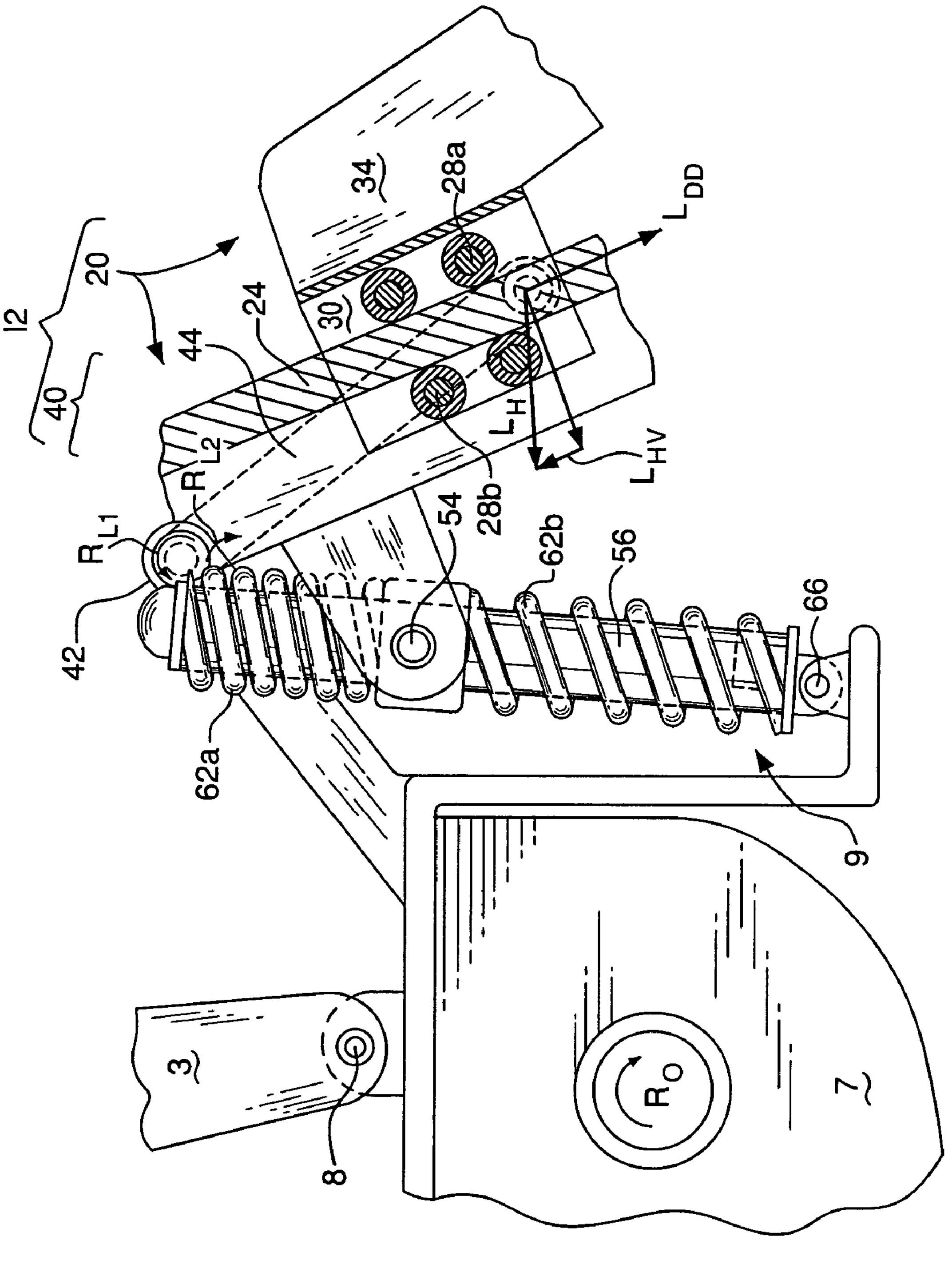
FIG. 5 is an enlarged side view of the anti-tip system wherein the anti-tip wheel is disposed to a lowermost vertical position for stabilizing the wheelchair when traveling on or down sloping terrain or declined surfaces.

In FIGS. 2 and 5, as the powered wheelchair decelerates or brakes, as may be encountered when the wheelchair travels down sloping surfaces or declined terrain, the drive train assembly 7 pivots in a clockwise direction, shown as an arrow $R_D$ in FIG. 5, about pivot point 8. The rotation of the drive train assembly 7 causes a substantially downward motion of the elongate tension member 56, thereby compressing the first spring element 62*a*. Furthermore, the first and second linkage members 42, 44 rotate in a clockwise and counter-clockwise direction, denoted by arrows $R_{L1}$ and $R_{L2}$, respectively, to effect downward translation, denoted by arrow $L_{DD}$, of the guide subassembly 20 and, consequently, the anti-tip wheel 16 (see FIG. 2). Such downward motion of the anti-tip wheel functions to stabilize the wheelchair about the pitch axis $P_A$ (FIG. 2) at a moment corresponding to a deceleration of the wheelchair 2. Once again, as torque reduces to lower levels, the first spring element 62*a* biases or returns the drive train and mounting assemblies 7, 12 to an original or neutral operating position.

Figure 6A:
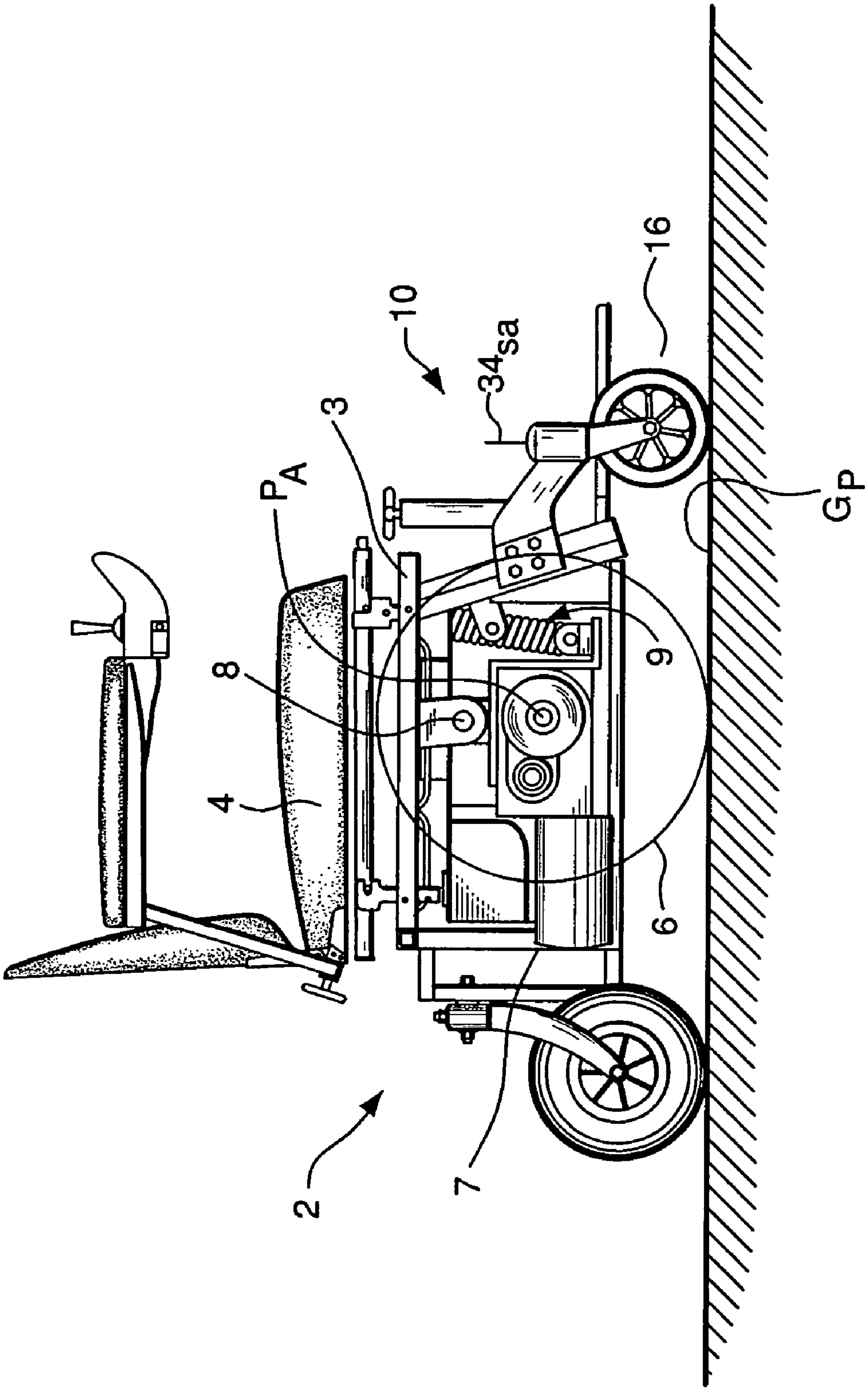
FIG. 6*a* is an enlarged side view of an alternate embodiment of the invention wherein the anti-tip wheel is biased to an operating position causing the wheel to contact the ground plane during routine operation.

While the embodiments shown in FIGS. 2, 3 and 5 depict the anti-tip system 10 having an anti-tip wheel slightly raised from the ground plane $G_P$, FIG. 6*a* illustrates an alternate embodiment of the active anti-tip system wherein each anti-tip wheel is contiguous with the ground plane $G_P$. More specifically, the suspension assembly 9 biases the anti-tip wheels 16' to effect ground contact while the wheel 16' is pivot mounted to the suspension arm 34 about a vertical axis $\mathbf{34}_{SA}$. With respect to the latter, each anti-tip wheel 16' may include a vertical post (not shown) supported for rotation by one or more cylindrical bearings (also not shown) disposed within a cylindrical sleeve $\mathbf{34}_S$ of the suspension arm 34. As such, during routine operation, six (6) wheels of the wheelchair 2 are in ground contact, i.e., rather than four (4), to provide an additional sense of stability for the wheelchair occupant. Moreover, the castored mount of the anti-tip wheels 16' enables the wheelchair to freely pivot about its vertical yaw axis to facilitate yaw control/motion.

In other embodiments of the invention, the guide subassembly 20 may be rearwardly inclined to augment the obstacle climbing capability of the powered wheelchair 2. That is, the guide subassembly 20 may be designed to cause the anti-tip wheel 16 to traverse linearly upward upon impacting an immobile object. Referring to FIG. 5, upon striking an object (not shown), a horizontal load $L_H$ is reacted along the guide surface 29*b* in a direction normal thereto. By angularly pre-positioning the guide subassembly 20, a substantially vertical component of the load $L_{HV}$ is developed to cause the suspension arm 34 and anti-tip wheel 16 to rise upwardly. This vertical travel augments the curb-climbing capability of the wheelchair.

Figure 6B:
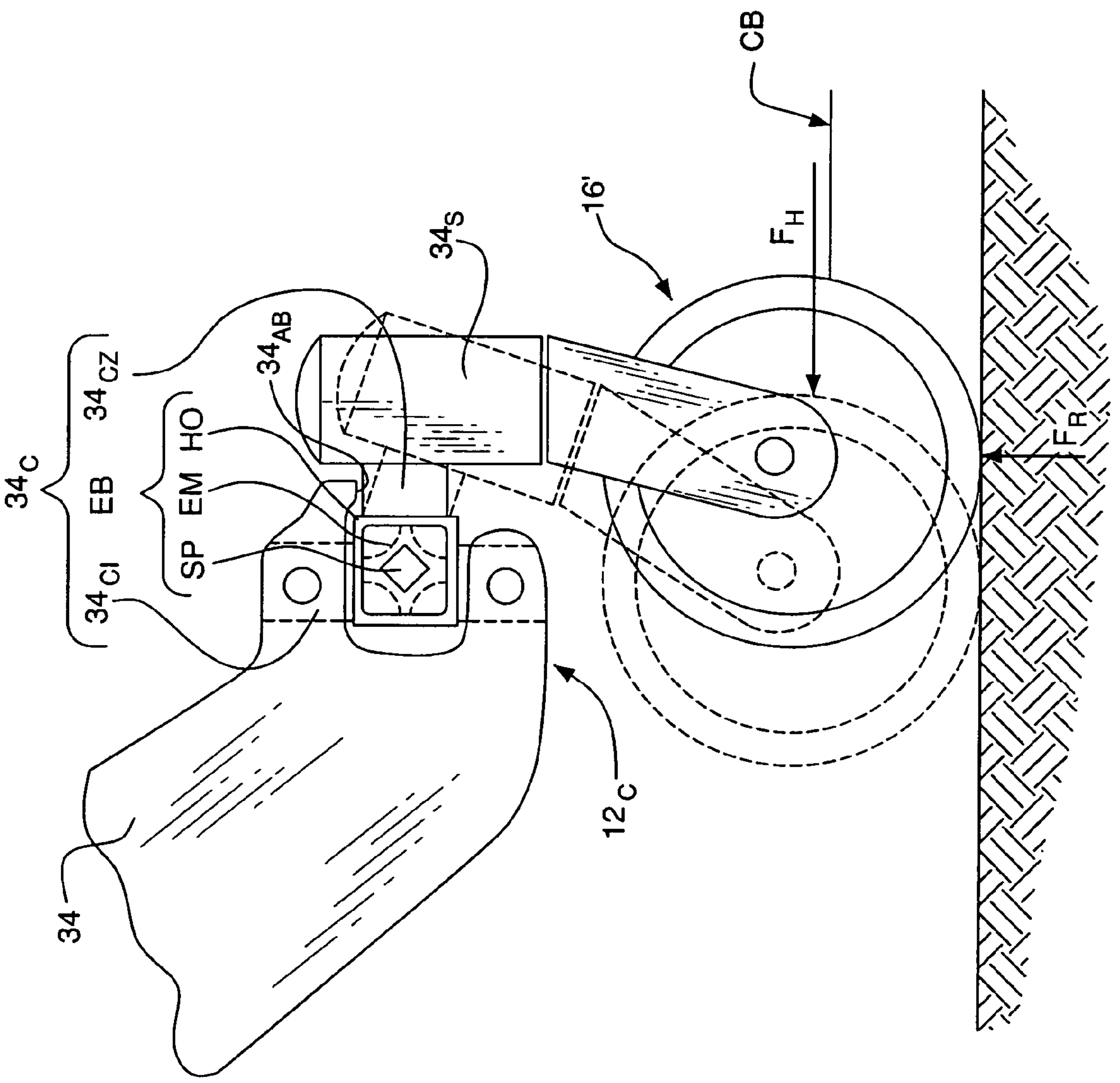
FIG. 6*b* is an enlarged side view of an alternate embodiment of the anti-tip system wherein a compliant bearing mount is employed to improve the ride efficacy of the wheelchair, i.e., when impacting /climbing curbs and/or other obstacles.

To effect a similar result, FIG. 6*b* shows yet another embodiment wherein the mounting assembly 12 includes a compliant mount $\mathbf{12}_C$ to facilitate inward displacement of the anti-tip wheel 16', i.e., toward the main structural frame 3 or main drive wheels 6, upon impacting a curb or obstacle CB. In the described embodiment, the compliant mount $\mathbf{12}_C$ is disposed between the suspension arm 34 and the vertical sleeve $\mathbf{34}_S$ of the anti-tip wheel 16' and comprises a resilient bearing EB disposed at the intersection of cross members $\mathbf{34}_{C1}$, $\mathbf{34}_{C2}$. More specifically, the bearing EB comprises a polygonally-shaped inner member, i.e., a shaft SP, a similarly shaped outer member (i.e., a housing HO), and a compliant elastomer EM disposed therebetween. The compliant elastomer EM is bonded to the linear surfaces LS of the shaft SP and the housing HO. Furthermore, the elastomer EM is formed by a plurality of elastomeric (e.g., rubber) elements that are preferably compressed between the inner shaft SP and the outer housing HO. As such, any lateral force tending to rotate the inner shaft SP relative to the outer housing HO produces deformation of the elastomer material EM. A resilient bearing EB such as the type described above is available from/sold by Rosta AG under the Tradename "Rubber Suspension System".

The compliant mount $\mathbf{34}_C$ facilitates inward displacement of the anti-tip wheel 16', i.e., via angular displacement of the vertical sleeve $\mathbf{34}_S$, but delimits or inhibits outward displacement of the anti-tip wheel 16'. This may be effected by any of a variety of structural combinations; for example, a simple abutment surface $\mathbf{34}_{AB}$ may be provided between the horizontal and vertical members $\mathbf{34}_{C1}$, $\mathbf{34}_{C2}$ to delimit the relative angular displacement of the members $\mathbf{34}_{C1}$, $\mathbf{34}_{C2}$ and angular displacement of the vertical sleeve $\mathbf{34}_S$. The resilient bearing EB of the compliant mount $\mathbf{34}_C$ segment enables displacement in response to an externally applied impact load in the direction of load vector $F_H$ while limiting displacement in response to a load in the direction of load vector $F_R$. As will be discussed in greater detail below, the compliant segment $\mathbf{24}_C$, therefore, augments the curb climbing ability of the anti-tip system 10 without degrading the pitch stabilizing capability thereof.

Figure 7:
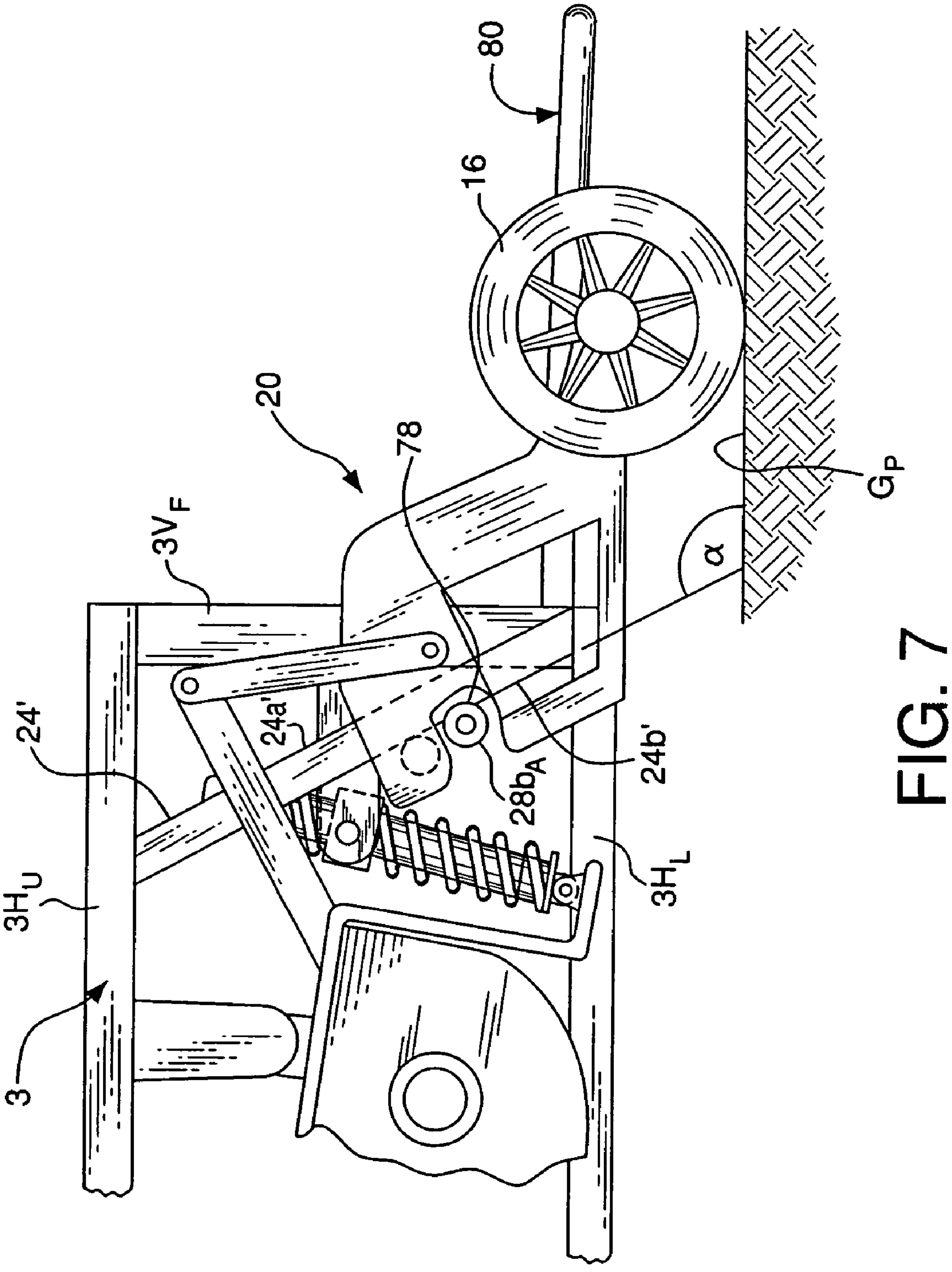
FIG. 7 is an enlarged side view of another embodiment of the inventive anti-tip system wherein the guide subassembly includes a rearwardly canted guide track having a detent formed therein for temporarily locking/maintaining the relative position of the anti-tip wheel relative to a ground plane.

In this embodiment, the guide subassembly 20 employs a track 24 which dually serves as: (i) a frontal support member for the main structural flame 3 and (ii) a mount for the anti-tip wheel 16. It will be appreciated, however, that the track 24 may solely function as a mount for the anti-tip wheel 16. For example, in FIG. 7, the guide subassembly 20 may employ a track 24' which is affixed at its upper and lower ends to horizontal supports $3H_U$, $3H_L$ of the frame 3. Further, in this embodiment, the clevis arms 76 for pivotally mounting the suspension assembly 9 is affixed to a frontal vertical support $3V_F$ of the frame 3. As such, this configuration permits greater design flexibility when determining the angle α of the guide surfaces 24*a'*, 24*b'*. For example, the track 24' may slope at a substantially greater angle, e.g., 135 degrees, without adversely impacting the structure of the frame 3. As discussed in the preceding paragraph, the advantage of such angular position relates to an improvement in the curb-climbing ability of the powered wheelchair.

Also shown in this embodiment is a detent 78 for momentarily holding a predefined linear position of the guide subassembly 20 and, consequently, maintaining the position of the anti-tip wheel relative to the ground plane $G_P$. For example, to maintain ground contact of the anti-tip wheel 16, the detent 78 may be formed along the aft guide surface 24*b'* such that the aft lower roller $28b_A$ of the guide subassembly 20 is caused to engage the detent 78 upon alignment therewith. As such, the wheelchair may be stabilized (4 or 6 wheels in ground contact) when an occupant puts weight on a footrest assembly 80, i.e., getting on or off of the wheelchair. When torque levels reach a threshold level (chosen as a function of the design requirements), the roller is caused to disengage the detent 78. Furthermore, it should be appreciated that the detent 78 may be formed at any position or along either of the guide surfaces 24*a'*, 24*b'* depending upon where, i.e., at what position, the guide subassembly 20 is to be temporarily locked/maintained in position.

In summary, the active anti-tip system of the present invention provides a mounting assembly 12 which enhances the curb-climbing ability of a powered wheelchair by increasing the displacement of the anti-tip wheel 16. That is, the vertical displacement of the ant-tip wheel 16 is increased without lengthening a suspension arm (as required by prior art anti-tip system designs). Furthermore, the increased displacement provided by the mounting assembly 12 enables enhanced pitch stability by causing the anti-tip wheel 16 to be lowered relative to the underlying ground plane $G_P$. That is, when the wheelchair 2 may be traveling on declined surfaces, the anti-tip wheel 16 may be positioned proximal to the ground plane i.e., at the required moment, to enhance pitch stability. With respect to the embodiment employing castored anti-tip wheels 16', the invention is capable of providing an immediate pitch stabilization response, i.e., eliminates the lag in response where the anti-tip wheels are raised off the ground.

Furthermore, the mounting arrangement 12 only requires a single suspension assembly 9, e.g., bi-directional strut, to bias the anti-tip wheel 16 to a predetermined operating position, i.e., fully-down, fully-up or a neutral position. As such, the anti-tip system 10 requires fewer components to replace and/or maintain. Moreover, the compliant mount $\mathbf{34}_C$ thereof, is capable of absorbing a portion of an externally applied impact load to improve the ride comfort. Additionally, the inward displacement enabled by the mount 34C changes the angle that the curb CB impacts or addresses an anti-tip 16' and shortens the distance between the curb CB and the main drive wheels 6. With respect to the former, a more favorable impact angle can produce a vertical component of force for augmenting the curb climbing ability of the wheelchair. With respect to the latter, by decreasing the distance to the main drive wheels 6, the wheels 6 may engage the curb CB before the wheelchair 2 beings to lose its forward momentum/inertia.

Finally, the anti-tip system of the present invention provides greater design flexibility with respect to the location, angular position and/or mounting of the anti-tip wheel 16 and the ability to design to meet various requirements. For example, the anti-tip wheel 16 may be located at nearly any operational position without significant modifications to the design of the mounting arrangement 12 or to the powered wheelchair 2. Generally, only modifications to the length of the linkages 42, 44 or guide track 24 will be required.

While the powered wheelchair and anti-tip system 10 has been described in terms of an embodiment which best exemplifies the anticipated use and application of the powered wheelchair, other embodiments are contemplated which will also fall within the scope and spirit of the invention. For example, while the anti-tip system 10 is shown to employ a pivoting link arrangement to transfer motion, i.e., rotational to linear, the translation means 40 may comprise a slotted link/pin arrangement. More specifically, a drive link may be rigidly affixed to the pivoting drive train assembly and have an elongate slot formed therein. A pin disposed in combination with the guide subassembly may accept and engage the elongate slot such that arcuate motion of the drive link effects translation of the guide subassembly. That is, the slot accommodates foreshortening affects, i.e., in the longitudinal direction, of the rotating drive link.

Furthermore, while opposing rollers 28*a*, 28*b* are shown to support and mount the suspension arm 34/anti-tip wheel 16 to a guide track 24, it should be appreciated that any bearing configuration capable of rolling or sliding upon a guide surface may be employed. For example, a sliding track having a generally inverted T-shaped cross sectional configuration may be employed with a sliding T-shaped bearing block disposed therein. Consequently the bearing block is captured within the T-shaped track or slot and mounted to the suspension arm of the anti-tip wheel.

Moreover, while the present invention employs a bi-directional strut 50 to suspend the drive train and mounting assemblies 7, 12, it will be appreciated that other suspension devices may be employed. Generally, any device or combination of devices which suspend the drive train assembly 7 and the mounting assembly 12, whether independently or in combination, relative to the main structural frame 3 may be utilized.

Further, a variety of other modifications to the embodiments will be apparent to those skilled in the art from the disclosure provided herein. Thus, the present invention may be embodied in other specific forms without departing from the spirit or essential attributes thereof and, accordingly, reference should be made to the appended claims, rather than to the foregoing specification, as indicating the scope of the invention.

What is claimed is:

1. An anti-tip system for stabilizing a vehicle about a pitch axis and relative to a ground plane, the vehicle having a drive-train assembly pivotally mounted to a main structural frame for independently driving a pair of drive wheels, the anti-tip system having at least one anti-tip wheel disposed to one side of the vehicle pitch axis, comprising:

a mounting assembly disposed in combination with the main structural frame for mounting the anti-tip wheel, the mounting assembly including a linear guide surface positioned substantially normal to a ground plane, at least one follower engaging the guide surface, the follower operatively connected with the anti-tip wheel, whereby the anti-tip wheel is directed linearly with respect to the ground plane by the engagement of the follower with the guide surface in response to the torque applied by the drive train to the drive wheels in driving the vehicle; and a suspension assembly disposed in combination with the mounting assembly for resiliently biasing the anti-tip wheels toward the ground plane.

2. The anti-tip system according to claim 1 wherein the mounting assembly is further adapted to permit an upwardly vertical displacement of the anti-tip wheel in response to a horizontal impact load imposed thereon.

3. The anti-tip system according to claim 2 wherein the mounting assembly is further adapted to permit a pivotal motion of said anti-tip wheel about a vertical axis.

4. The anti-tip system according to claim 2 wherein the mounting assembly further comprises:

a guide subassembly disposed in combination with the main structural frame for mounting the anti-tip wheel, and a means for translating pivotal motion of the drive-train assembly to said guide subassembly in response to the torque created within the drive-train assembly as part of said vehicle acceleration or deceleration.

5. The anti-tip system according to claim 2 wherein the suspension assembly is a resiliently biased, bi-directional strut pivot mounted to the main structural frame at one end thereof and to the mounting assembly at the other end thereof.

6. The anti-tip system according to claim 1 wherein the suspension assembly is a bi-directional strut pivotally mounted to the main structural frame and to the mounting assembly at one end thereof.

7. The anti-tip system according to claim 1, wherein the suspension assembly includes a resiliently biased, bi-directional strut assembly pivotally mounted to the main structural frame at a position between the drive train assembly and the guide subassembly.

8. The anti-tip system according to claim 1, wherein the guide surface is rearwardly inclined.

9. The anti-tip system according to claim 8 wherein the guide surface defines an angle relative to the ground plane, said angle being within a range of about 100 degrees to about 140 degrees.

10. The anti-tip system according to claim 1, wherein the follower includes at least one roller for engaging the guide surface.

11. The powered vehicle according to claim 10, wherein the guide surface defines an angle of about 100° to about 140° with respect to the ground plane.

12. An anti-tip system for stabilizing a vehicle about a pitch axis and relative to a ground plane, the vehicle having a drive-train assembly pivotally mounted to a main structural frame for independently driving a pair of drive wheels, the anti-tip system having at least one anti-tip wheel disposed to one side of the vehicle pitch axis, the system comprising:

a mounting assembly disposed in combination with the main structural frame for mounting the anti-tip wheel and for causing the anti-tip wheel to traverse linearly with respect to the ground plane in response to the torque created by the drive-train assembly in driving the drive wheels of the vehicle, the mounting assembly having a guide subassembly, the guide subassembly including a guide track mounting to an end of the main structural frame and defining back-to-back roller guide surfaces;

a pair of opposing rollers engaging and capturing the guide surfaces therebetween a roller cage for rotatably supporting said rollers;

a suspension arm affixed to the roller cage at one end thereof and rotatably mounting the anti-tip wheel at the other end thereof;

means for translating pivotal motion of the drive-train assembly to said guide subassembly in response to torque created within the drive-train assembly as part of said vehicle acceleration or deceleration; and a suspension assembly disposed in combination with the mounting assembly for resiliently biasing the anti-tip wheels toward the ground plane.

13. The anti-tip system according to claim 12 wherein at least one of the guide surfaces of the guide subassembly includes a detent, and wherein at least one of said rollers engages said detent to momentarily maintain the anti-tip wheel at a predefined position relative to the ground plane.

14. The anti-tip system according to claim 12 wherein the translating means comprises a first linkage rigidly affixed to the drive train assembly, and a second linkage pivotally mounting to said first linkage at one end thereof and to said guide subassembly at the other end.

15. The anti-tip system according to claim 12, wherein the translation means comprises a first linkage rigidly affixed to the drive-train assembly, and a second linkage pivotally mounting to said first linkage at one end thereof and to said guide subassembly at the other end, said second linkage pivotally mounted to said roller cage.

16. An anti-tip system for stabilizing a vehicle about a pitch axis and relative to a ground plane, the vehicle having a drive-train assembly pivotally mounted to a main structural frame for independently driving a pair of drive wheels, the anti-tip system having at least one anti-tip wheel disposed to one side of the vehicle pitch axis, the system comprising:

a mounting assembly disposed in combination with the main structural frame for mounting the anti-tip wheel and for causing the anti-tip wheel to traverse linearly with respect to the ground plane in response to the torque created by the drive train assembly in driving the drive wheels of the vehicle;

a suspension assembly disposed in combination with the mounting assembly for resiliently biasing the anti-tip wheels toward the ground plane, the suspension assembly being a bi-directional strut pivotally mounted to the main structural frame and to the mounting assembly at one end thereof, wherein the bi-directional strut assembly includes a central collar pivot mounted to the main structural frame, first and second spring elements each having an end affixed to the central collar, and a tension member having each end thereof tied to the other end of each spring element, said tension member pivotally connected to said translation means and capable of traversing relative to each spring member such that motion of said translation means is imparted to said tension member and such that said spring elements bias said tension member and said anti-tip wheels to said predetermined operating position.

17. A powered vehicle comprising:

a main structural frame;

a pair of main drive wheels, each drive wheel mounting to and supporting the main structural frame about a rotational axis;

a drive train assembly pivotally mounting to the main structural frame about a pivot axis and capable of bi-directional rotation about said pivot axis when applying torque to the drive wheels; and an active anti-tip system for stabilizing the frame about a pitch axis and relative to a ground plane, said active anti-tip system comprising at least one anti-tip wheel;

a mounting assembly disposed in combination with the main structural frame for mounting the anti-tip wheel, the mounting assembly including a linear guide surface that is substantially normal to a ground plane, the guide surface engaging at least one roller, the roller operatively connected to the anti-tip wheel, whereby the anti-tip wheel is directed along a linear path with respect to the ground plane by the linear guide surface in response to the torque applied by the drive-train assembly to the drive wheels; and a suspension assembly disposed in combination with the mounting assembly for biasing the anti-tip wheel into contact with the ground plane.

18. The powered vehicle according to claim 17 wherein the mounting assembly is adapted to effect an upwardly vertical displacement of the anti-tip wheel in response to a horizontal impact load imposed thereon.

19. The powered vehicle according to claim 18 wherein the mounting assembly is adapted to effect a pivoting motion of said anti-tip wheel about a vertical axis.

20. The powered vehicle according to claim 17 wherein the mounting assembly further comprises:

a guide subassembly disposed in combination with the main structural frame for mounting the anti-tip wheel, and a means for translating pivotal motion of the drive-train assembly to said guide subassembly in response to the torque of the drive train assembly.

21. A powered vehicle according to claim 17 wherein the suspension assembly is a bi-directional strut pivot mounted to the main structural frame at one end thereof and to the mounting assembly at the other end thereof.

22. A powered vehicle according to claim 17 further comprising:

a compliant mount for an anti-tip system for a vehicle having a suspension arm adapted to support said anti-tip wheel, said compliant mount comprising an outer member;

an inner member, one of said members coupled to said anti-tip wheel and the other of said members coupled to said suspension arm;

a compliant elastomer disposed between and bonding to surfaces of said inner and outer member, said compliant elastomer permitting relative rotational displacement between the members to enable inward displacement of said anti-tip wheel.

23. The powered vehicle according to claim 17, wherein the guide surface is rearwardly inclined.

* * * * *

UNITED STATES PATENT AND TRADEMARK OFFICE

CERTIFICATE OF CORRECTION

PATENT NO. : 7,232,008 B2
APPLICATION NO. : 10/943713
DATED : June 19, 2007
INVENTOR(S) : Levi et al.

It is certified that error appears in the above-identified patent and that said Letters Patent is hereby corrected as shown below:

In Column 9
At line 36, change “ant-tip” to --anti-tip--.

Signed and Sealed this

Eighteenth Day of September, 2007

JON W. DUDAS
*Director of the United States Patent and Trademark Office*